United States Patent [19]

Krauer

[11] 3,737,747
[45] June 5, 1973

[54] SERVOMECHANISM INCLUDING A POLYPHASE ALTERNATING CURRENT SYNCHRONOUS MOTOR

[75] Inventor: Otto Albert Krauer, Tuckahoe, N.Y.

[73] Assignee: Otis Elevator Company, New York, N.Y.

[22] Filed: May 10, 1971

[21] Appl. No.: 141,683

[52] U.S. Cl. .................... 318/178, 318/171, 187/29, 318/179, 318/254
[51] Int. Cl. ............................................. H02p 5/28
[58] Field of Search .................... 318/171, 175, 178, 318/179, 180, 186, 254, 138; 187/29

[56] References Cited

UNITED STATES PATENTS

| | | | |
|---|---|---|---|
| 3,551,766 | 12/1970 | Stemmler | 310/179 |
| 3,461,367 | 8/1969 | Takeyasu et al. | 318/254 X |
| 3,612,970 | 10/1971 | Sofan | 318/175 |
| 3,588,645 | 6/1971 | Gilmore | 318/178 |
| 3,254,285 | 5/1966 | Jotten | 318/138 |
| 3,383,574 | 5/1968 | Manteuffel | 318/175 |

Primary Examiner—T. E. Lynch
Attorney—Joseph L. Sharon and Robert T. Mayer

[57] ABSTRACT

A servomechanism including a polyphase alternating current synchronous motor and a variable frequency, variable magnitude voltage generating means, said generating means comprising transducing apparatus responsive to the position of the rotor of said motor as well as to a desired speed signal and an actual speed signal to generate signals signifying those components of the voltages to be applied to the stator phase windings of said motor to balance, one, the counter electromotive fore which would be produced across each phase winding at no load at the speed at which the rotor is then rotating and the resistance voltage drop produced across each phase winding by the current then flowing therein, and, two, the leakage and the synchronous reactance voltage drop produced across each phase winding by the current then flowing therein and at the speed at which the rotor is then rotating. These transducing apparatus signals for each phase, after being summed vectorially, caused signal translating apparatus of the voltage generating means to apply voltages to their respective stator phase windings to operate said motor according to said desired speed signal.

12 Claims, 1 Drawing Figure

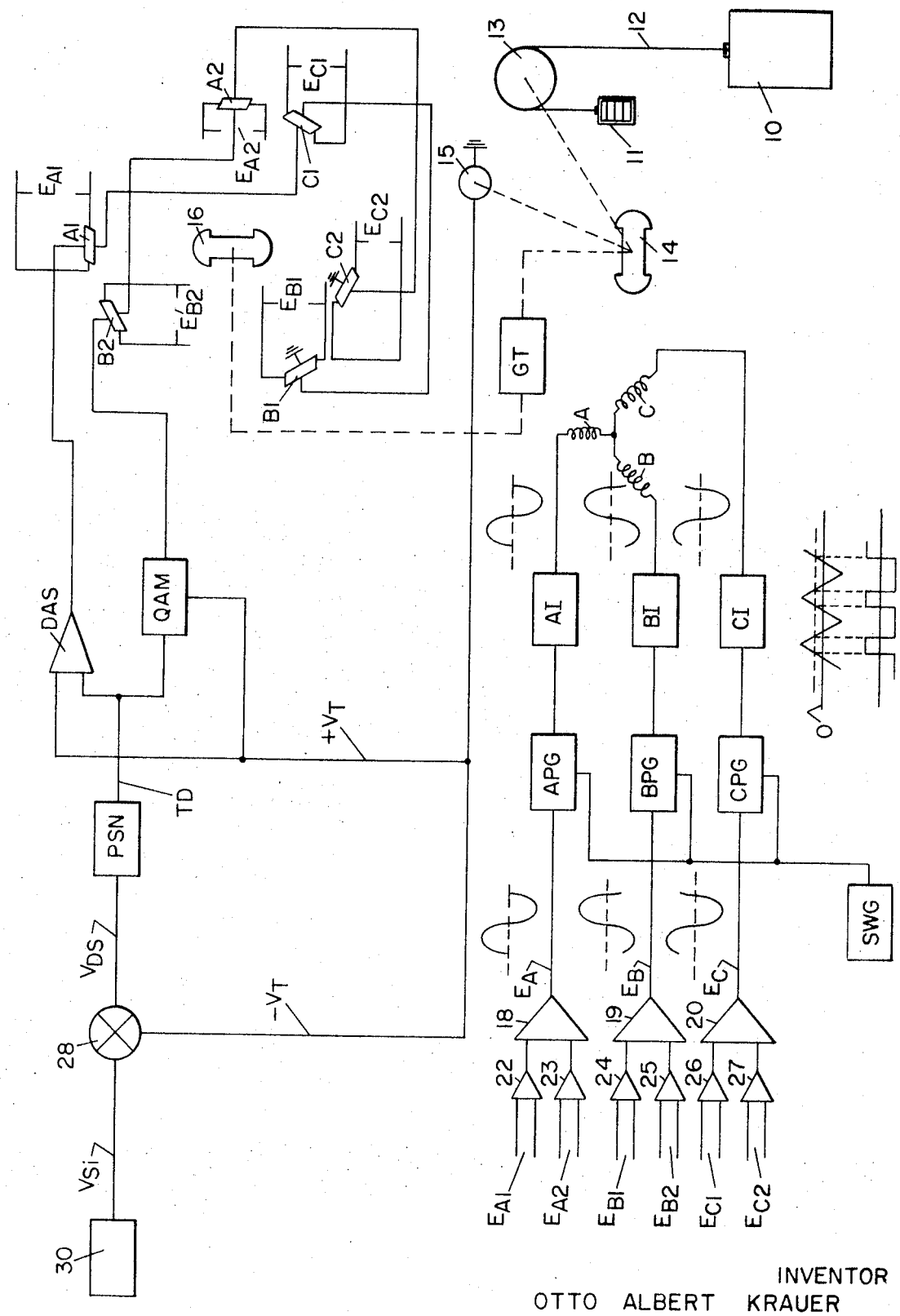

SERVOMECHANISM INCLUDING A POLYPHASE ALTERNATING CURRENT SYNCHRONOUS MOTOR

This invention relates to servomechanisms. More particularly, it relates to a servomechanism including a polyphase alternating current synchronous motor.

Where it is desired to position a movable element accurately and to maintain it so positioned as well as to move it rapidly in a predetermined manner from one such position to another, it has heretofore been accepted practice to employ direct current motor control systems because their inherent characteristics make them ideally suited for such applications. Their motor speeds can be controlled accurately over their entire speed range from standstill to a rated running speed and they are capable of continuously producing high torque at any speed throughout that range as well as at standstill and in starting. This enables such a system to start under any load within its rated capacity, to drive that load to any selected position in a predetermined manner and to maintain it there for as long as desired.

In such systems the load, or movable element, may be coupled to the direct current motor through gears so that the motor may operate at higher speeds than it is desired to drive the load. This permits the use of a smaller motor than would be required if such a geared coupling were not employed. However, where fine positioning accuracy as well as relatively high speed operation is desired, such as in a high speed elevator, it has been found more suitable to drive the elevator directly by large direct current motors without a gear coupling. This eliminates any inaccuracy which might be introduced by clearance, or backlash, between gear teeth. But because of the direct coupling between the motor and the elevator car, it has the disadvantage of substantially increasing the size of the motor to obtain accurately controlled slow speed operation.

Where extremely fine positioning accuracy is desired, such as in satellite tracking antenna systems, the diameter of the commutators of the direct current driving motors must also be substantially increased to reduce the discontinuities in position introduced by the commutator bars. Such discontinuities, of course, can never be fully eliminated from direct current motor control systems as long as a mechanical commutator is employed.

It is desirable to replace the direct current motors of the foregoing systems with some type of alternating current motor. An alternating current motor requires less copper to build than a direct current motor capable of delivering comparable torque. For this reason it is less costly to manufacture. Manufacturing costs are further reduced because an alternating current motor has no commutator. For this same reason, it requires less service and maintenance and thus lowers these costs also. The lack of a commutator also completely eliminates the positional discontinuities that are inherent in direct current motors.

It is an object of this invention to provide an improved motor control system.

It is another object of this invention to provide a servomechanism including a polyphase alternating current motor that is operable to control the out of phase currents that the motor generates thereby enhancing the torque producing capabilities of the motor.

It is still another object of this invention to provide a servomechanism including a polyphase alternating current synchronous motor that is operable to start the motor under any load within its rated capacity, to move the load to any selected position in a predetermined continuously controlled manner and to produce torque to maintain the load at that position for as long as desired.

Accordingly, there is provided a servomechanism including a polyphase alternating current motor operable in response to the continuous application to its rotor of any load within the capacity of the servomechanism to produce torque to maintain said rotor at zero angular velocity at any angular position of said rotor.

For convenience purposes, the invention will be described as applied in an elevator system. It is to be understood, however, that the invention is in no way limited to such an application and is suitable for various other applications in which direct current motor control systems are presently employed. Also, the motor disclosed is a three phase synchronous motor, it being understood that the invention is applicable to any polyphase alternating current synchronous motor.

Other advantages of the present invention as well as additional objects and features thereof will be apparent to those skilled in the art from the following description when considered in conjunction with the appended claims and accompanying drawing, in which the sole figure is a schematic representation of a servomechanism including a polyphase alternating current synchronous motor.

Referring specifically to the drawing, there is depicted therein an elevator car 10 and its counterweight 11 supported in typical fashion by hoist ropes 12 wrapped over driving sheave 13. Sheave 13 is mounted on the same shaft as rotor 14 of a three phase alternating current synchronous motor whose stator phase windings are pictorially represented by coils A, B and C. A suitable three phase synchronous motor for an elevator installation whose duty rating is 4,000 lbs. at 1,200 feet per minute and whose sheave measures 36 inches in diameter with a moment of inertia at the motor shaft of 1,570 lbs. ft. sec.$^2$/rad. includes a 14 pole permanent magnet rotor which produces a sinusoidal magnetomotive force or flux distribution. Its full load torque rating is 3,900 lbs. ft. The full load rated speed of this motor is 127.5 r.p.m. with a stator frequency of 15 cycles per second and a rated stator voltage of 200 volts with a stator current per phase of approximately 175 amperes at rated load at rated speed.

Direct current tachometer generator 15 is mechanically connected in any suitable fashion to be driven by the shaft of rotor 14 and produces a signal along lines $+V_T$ and $-V_T$ signifying the speed of rotation of rotor 14. Also connected to be driven by rotor 14 is a gear train GT. The output of this gear train drives a two pole permanent magnet rotor 16 of a Hall effect rotor position transducer to be explained hereinafter. The gear ratio of this gear train GT is such as to drive the rotor of the position transducer one mechanical revolution for each revolution through 360 electrical degrees of rotation of rotor 14 of the synchronous motor. Thus, with the motor hereinbefore described, rotor 16 of the position transducer rotates seven times for each single physical revolution of rotor 14 of the synchronous motor.

Connected to supply voltage to stator phase windings A, B and C is equipment identified as a variable frequency variable magnitude voltage generating means. At all frequencies within the capacity of this equipment it applies to the individual stator phase windings voltages which are so related to each other in magnitude, frequency and phase angle as to cause the stator windings to produce a sinusoidal magnetomotive force or flux distribution. Included as part of this equipment are pulse modulated inverter circuits AI, BI and CI. Suitable such inverter circuits may take the form of the well known McMurray inverter. Forming part of each inverter circuit but not separately illustrated is an individual gate control circuit. These inverter circuits are controlled by pulses applied to their gate control circuits by pulse generators APG, BPG and CPG which operate at a pulse repetition rate of 1,000 pulses a second.

The input signal to each pulse generator is modulated by the output signal of sawtooth wave generator SWG which also operates at a repetition rate of 1,000 a second. The output signal of generator SWG, as shown in the representation of the waveform illustrated below inverter CI in the drawing, is produced with equal halves of the wave above and below the zero axis which is represented by the solid line marked O. This output signal is added to the input signal applied to each of the pulse generators APG, BPG and CPG along lines $E_A$, $E_B$ and $E_C$, respectively, and the individual combinations of these signals pass through level detectors (not separately shown) individual to each pulse generator. Each of these level detectors causes its associated pulse generator to produce pulses containing positive and/or negative portions depending upon how much of the combined signal it receives remains above or below the zero axis. Thus, in the representative waveform if the dotted line is now considered the zero axis such that approximately two-thirds of the sawtooth wave applied to one of the pulse generators has been displaced below the zero axis by the input signal to the pulse generator, each pulse of the output signal from the pulse generator for each such cycle of the sawtooth wave contains a portion which for approximately one-third of the pulse is positive and a portion which for the remainder of the pulse is negative (as illustrated below the sawtooth wave). Similarly, other proportions of positive and negative portions from totally positive to totally negative are possible depending upon the amount of each cycle of the sawtooth wave which is displaced above and below the zero axis by the input signals to the pulse generators.

Inverter circuits AI, BI and CI, pulse generators APG, BPG and CPG, and sawtooth wave generator SWG comprise that part of the voltage generating means hereinafter identified as signal translating apparatus. This apparatus, as is illustrated by the sinusoidally shaped waveforms adjacent each pulse generator and each inverter circuit, produce voltages for the phase windings A, B and C which are faithful reproductions of the signals applied along lines $E_A$, $E_B$ and $E_C$, respectively, in phase angle and frequency but which vary therefrom in magnitude by a predetermined constant scale factor.

The signals applied along lines $E_A$, $E_B$ and $E_C$ are produced by amplifiers 18 through 20, respectively. Each of these is a summation amplifier which produces an output signal proportional to the vector sum of the input signals it receives from amplifiers 22 and 23 or 24 and 25 or 26 and 27, respectively. Each of amplifiers 22 through 27 is a differential amplifier which produces an output signal referenced to ground which is directly proportional to the magnitude of the signal applied along its respective input lines $E_{A1}$, $E_{A2}$, $E_{B1}$, $E_{B2}$, $E_{C1}$ and $E_{C2}$. Amplifiers 18 through 27 comprise that part of the voltage generating means hereinafter referred to as the signal summing amplifier circuitry.

Also included as part of the voltage generating means is the previously mentioned rotor position transducer comprising the two pole permanent magnet rotor 16 which is mounted for rotation in a cylindrical stator yoke (not shown) composed of a satisfactory magnetic material. Suitably the permanent magnets of rotor 16 produce a sinusoidal flux distribution throughout the stator yoke with a maximum flux of 10,000 gauss (lines/sq. cm.). Mounted in any suitable fashion at intervals around the interior surface of the stator yoke are a plurality of Hall effect elements A1, A2, B1, B2, C1 and C2. Hall effect elements A1, B1 and C1 are so mounted that the physical displacements between them correspond with the electrical displacements between the axes of the different phase windings of the stator poles of the motor. In the disclosed embodiment since the axes of the windings of each of the stator poles of the three phase motor are displaced one from the other by 120 electrical degrees, elements A1, B1 and C1 are displaced from each other by 120 mechanical degrees about the transducer stator yoke. Elements A2, B2 and C2 are mounted in quadrature with their respective corresponding elements.

As mentioned, rotor 14 of the motor and rotor 16 of the position transducer are mechanically connected through gear train GT such that each electrical degree of revolution of rotor 14 is represented by a mechanical degree of revolution of rotor 16. Furthermore this connection is made so that whenever the seven north poles of rotor 14 are passing in a particular direction the physical location of the seven axes of one of the phase windings of the stator, say phase winding A, the north pole of rotor 16 is passing in the same direction the Hall effect element A2 which is in quadrature with the element A1 corresponding to phase winding A.

Current is provided for the Hall effect elements A1, B1 and C1 whose physical locations correspond to the physical locations of the axes of the stator pole phase windings through a series connection from direct axis summing amplifier DAS. Similarly, current is provided for each of the quadrature Hall effect elements through a series connection from quadrature axis multiplier QAM. As is well known, each Hall effect element produces an output voltage signal along its respective output lines $E_{A1}$, $E_{A2}$, etc. which is a function of the product of the magnitude of the current applied to the element from either direct axis summing amplifier DAS or quadrature axis multiplier QAM, whatever the case may be, and the magnitude of the flux passing through the element produced by the magnetomotive force generated by rotor 16.

Direct axis summing amplifier DAS produces an output signal whose magnitude is proportional to the sum of the magnitude of the signal along line TD and that of the signal along line $+V_T$. As will be explained the signal along line TD signifies the difference between a speed at which it is desired that rotor 14 rotate and the actual speed at which it is rotating. It has already been stated that the signal along line $+V_T$ is produced by tachometer generator 15 and signifies the actual speed at which rotor 14 is rotating. This line is designated $+V_T$ to signify that the signal applied along it is to be understood to be an additive function in the mathematical analysis of the system in contrast to the signal along line $-V_T$ which it is to be understood is a subtractive function in such analysis.

Amplifier DAS contains two separate linear scale factors. One produces one value of current for each volt of input signal along line $+V_T$ while the other produces a different and lesser value of current for each volt of signal along line TD. The reason for this is that in response to any input signal along line $+V_T$, an output signal is produced by amplifier DAS which generates applied voltages for phase windings A, B and C which balance the counter electromotive forces which would be produced in the respective windings at no load at the speed represented by the signal along line $+V_T$. Whereas in response to any input signal along line TD, an output signal is produced by amplifier DAS which generates applied voltage for phase windings A, B and C which balance the resistance, or IR, voltage drops across each winding produced by the currents then flowing in the windings.

Quadrature axis multiplier QAM produces an output signal whose magnitude is a linear function of the product of the magnitude of the signal along line $+V_T$ and that along line TD. The output signal from multiplier QAM produced in response to any signals along lines $+V_T$ and TD generates applied voltages for phase windings A, B and C which balance the leakage and synchronous reactance, or total IX, voltage drops across each winding produced at the speed represented by the signal along line $+V_T$ and by the currents then flowing in the windings. By synchronous reactance is meant the apparent reactance resulting from armature reaction.

Since each output signal from amplifier DAS generates applied voltages for the phase windings which not only balance the counter electromotive forces which would be produced in the windings at no load at the speed at which the rotor is rotating but also the IR voltage drops produced across the windings by the current then flowing therein and each output signal from multiplier QAM generates applied voltages for the phase windings which balance the total IX voltage drops produced across the windings by the current then flowing therein, it is evident from well known synchronous motor analysis that the vector sum of voltages for each winding produces the voltage to be applied to the respective winding for each condition of speed and torque.

Direct axis summing amplifier DAS, quadrature axis multiplier QAM, the rotor position transducer and the signal or vector summing amplifiers 18 through 27 comprise what is hereinafter referred to as transducing apparatus. This apparatus in combination with the hereinbefore mentioned signal translating apparatus and with the hereinafter disclosed summation circuit 28 comprise the voltage generating means.

The input signal applied along line TD to both direct axis summing amplifier DAS and quadrature axis multiplier QAM is transmitted from summation circuit 28 along line $V_{DS}$ through the preamplifier circuit PSN. Preamplifier PSN may also suitably include stability, or response shaping, networks to provide a response for the system as desired.

One of the input signals to summation circuit 28 is a desired speed signal applied along line $V_{St}$ from speed dictation apparatus 30. This signal is algebraically added to the other input signal, the actual speed signal, applied along line $-V_T$ from tachometer generator 15, to produce the output difference signal. Speed dictation apparatus 30 in the disclosed elevator system may take any one of a number of suitable forms, one such being that disclosed in U.S. Pat. No. 3,552,524 granted to Sidney Howard Benjamin and Otto Albert Krauer on Jan. 5, 1971.

The functioning of the various components under operating conditions will aid in understanding the invention. Assume the elevator car is stopped level with a landing that its doors are open and that the number of passengers in the car are heavy enough to produce a condition of balanced, or no net, load, i.e. the combined weight of the passengers and the car equals the weight of the counterweight. Also assume that the brake (not shown) is lifted so that the rotor is free to move in response to a change in the weight of the passengers in the car or in response to torque developed by the motor.

Also, assume that the axes of the magnetomotive forces of the poles of rotor 14 are each displaced 90 electrical degrees from the physical location of the axes of the phase windings A of the stator poles. Under these conditions the desired speed signal from speed dictation apparatus 30 is zero so that no signal is applied to first summation circuit 28 along line $V_{St}$. Tachometer generator 15 is also applying no signal along lines $-V_T$ and $+V_T$ to summation circuit 28 and direct axis summing amplifier DAS and quadrature axis multiplier QAM. As a result, there is no difference signal applied by summation circuit 28 to preamplifier PSN. This means that there is no torque required from the motor and so no signal is applied along line TD to direct axis summing amplifier DAS and quadrature axis multiplier QAM either.

As a result, no current is applied to any of the Hall effect elements A1, A2, etc. and they produce no output voltages. Thus, no voltages are transmitted along lines $E_A$, $E_B$ and $E_C$ and no voltages are applied to motor phase windings A, B and C.

Assume now that the number of passengers on the car has increased from that which produced the previously assumed condition of balanced load to that which produces a condition of approximately 100 percent of full rated load. In actual practice this type of change is a relatively slow happening one which gradually stretches the hoist ropes causing the car to tend to move down away from the landing. This is counteracted by the lifting of the brake and the application of power to the motor to restore the car to within a desired accuracy of the landing. For present purposes, however, the stretch of the ropes will be neglected and it will be assumed that the car is once again stopped at the landing in a stabilized condition with its brake lifted.

Suitably in response to the application of this load on the car the control system maintains it at a distance of approximately one-tenth of an inch of being level with the landing. Thus, upon the number of passengers in the car increasing from balanced load to approximately 100 percent full load the car moves down approximately one-tenth of an inch below the landing level, the position it was previously in with balanced load on it.

Because rope stretch is being neglected, this one-tenth of an inch is reflected at sheave 13 and rotor 14 by a clockwise rotation of approximately 0.32 mechanical degrees (as viewed in the drawing). Since the motor has 14 poles, this mechanical rotation is equivalent to 2.24° of electrical rotation.

Simultaneously, speed dictation apparatus 30, which includes the typical elevator selector mechanism (not shown), produces an electrical signal representative of the one-tenth of an inch the car is below the level of the landing or the 0.32 mechanical degrees rotor 14 has rotated. This signal is applied along line $V_{St}$ to summation circuit 28 where it is algebraically added to the signal along line $-V_T$ from tachometer generator 15. Since under the assumed conditions car 10 is not moving the signal along line $-V_T$ is zero. Thus, summation circuit 28 produces an output signal along line $V_{DS}$ which is proportional to the magnitude of the signal along line $V_{St}$. In the disclosed embodiment summation circuit 28 has a 20 to 1 gain with the result that the signal applied along line $V_{DS}$ under the assumed conditions is 20 times as large as the signal applied along line $V_{St}$. With the speed dictation apparatus of the forementioned Benjamin and Krauer patent at approximately one-tenth of an inch from a landing an output signal of approximately 6.35 millivolts is produced. Thus, summation circuit 28 produces an output voltage in response to this input of approximately 127 millivolts. Preamplifier PSN also has a gain of 20 to 1 and this 127 millivolt signal causes the preamplifier to produce approximately a 2.54 volt signal along line TD and apply it as inputs to direct axis summing amplifier DAS and quadrature axis multiplier QAM.

Since rotor 14 is assumed to be at standstill no signal is applied along line $+V_T$ and thus the output of quadrature axis multiplier QAM is zero. Amplifier DAS, however, produces an output current of approximately 0.882 milliamps for each volt of input along line TD. Thus the 2.54 volt signal applied along line TD to direct axis summing amplifier DAS causes an output current of approximately 2.24 milliamps to flow to direct axis Hall effect elements A1, B1 and C1 corresponding to phase windings A, B and C, respectively. The result of the application of this current to Hall effect elements A1, B1 and C1 combined with the physical rotation of rotor 16 through 2.24 mechanical degrees in the clockwise direction (as viewed in the drawing) is that element A1 produces an output voltage of 5.66 millivolts, element B1 produces an output voltage of −2.61 millivolts and element C1 produces an output voltage of −3.05 millivolts.

These voltages are applied to the signal summing amplifier circuitry including amplifiers 18 through 27 and result in voltages above ground on lines $E_A$, $E_B$ and $E_C$ of 5.66 millivolts, −2.61 millivolts and −3.06 millivolts, respectively. Upon application of these signal voltages to their associated pulse generators APG, BPG and CPG the gate control circuitry operates to enable the associated inverters AI, BI and CI to apply voltages of 5.66 volts, −2.61 volts and −3.05 volts to their respective stator phase windings A, B and C. Since each of the stator windings in the disclosed embodiment has a d.c. resistance of approximately 0.035 ohms these voltages produce currents in each of their respective windings of −161.7 amperes, 74.6 amperes and 87.1 amperes. The currents in the stator phase windings are of opposite polarity to their applied voltage in accordance with the polarities assumed for the disclosed embodiment. These currents provide a resultant magnetomotive force in each of the stator poles of sufficient magnitude and the axis of which is at approximately a 90° angle with the axis of the magnetomotive force of each associated rotor pole to provide sufficient torque to balance the torque applied by the approximate 100 percent full load to maintain the load at one-tenth of an inch of the landing with rotor 14 at zero angular velocity.

Assume now that the motor has been accelerated to a constant speed in response to a desired speed signal equivalent to 127.5 r.p.m. while the load applied to the rotor continues to remain at the previously mentioned approximate 100 percent full load condition. How the acceleration operation takes place will not be explained for the sake of conciseness but will be apparent from the following description of the operation of the servomechanism under the assumed conditions in which the effect of speed on the operation of amplifier DAS and multiplier QAM is explained.

To dictate full speed of 127.5 r.p.m. the selector mechanism of the foregoing Benjamin and Krauer patent applies a voltage of 7.55 volts along line $V_{St}$. With full load in the car, however, the elevator does not move at 1,200 f.p.m. or the equivalent of rotor 14 rotating at 127.5 r.p.m. because part of the speed dictation signal is employed to generate the torque required by the load. In the disclosed embodiment this part of the signal amounts to approximately 0.1 percent of the rated speed signal. Thus, in response to a desired rated speed signal of 7.55 volts at full load rotor 14 rotates at a speed of 99.9 percent of rated speed and tachometer generator 15 produces a signal not of 7.55 volts but of 7.544 volts.

As a result, with the same load in the car a signal of 2.54 volts is again applied along line TD. As before, this causes amplifier DAS to produce a current of 2.24 milliamps or 0.882 milliamps for each volt of signal along line TD. At the same time a signal of 7.544 volts is applied to amplifier DAS along line $+V_T$ which at the scale factor of 15 milliamps for each volt of signal along line $+V_T$ produces an output current of 113.0 milliamps. Added to the 2.24 milliamps produced in response to the signal along line TD, this produces an output current from amplifier DAS of 115.24 milliamps.

At the same time the 2.54 volt signal along line TD and the 7.544 volt signal along line $+V_T$ are applied to multiplier QAM and produce an output current of approximately 44.2 milliamps, multiplier QAM being linearly scale to produce 2.2 milliamps for each unit of the product of the signals along lines TD and $+V_T$. These signals from amplifier DAS and multiplier QAM are applied to Hall effect elements A1, B1 and C1 and A2, B2 and C2, respectively, and cause sinusoidal voltages to be produced across lines $E_{A1}$, $E_{B1}$ and $E_{C1}$ which are 120° out of phase with each other. Each of these voltages is also 90° out of phase with its associated quadrature voltage produced across lines $E_{A2}$, $E_{B2}$ and $E_{C2}$. The maximum magnitude of each of the voltages across lines $E_{A1}$, $E_{B1}$ and $E_{C1}$ is 288.6 millivolts. The maximum magnitude of each of the voltages across lines $E_{A2}$, $E_{B2}$ and $E_{C2}$ is 105.5 millivolts. The frequency of each of these six voltages is approximately 15 c.p.s.

The voltages across these six lines from the rotor position transducer are applied to the signal summing amplifier circuitry in which each pair is vectorially summed to produce sinusoidal voltages along lines $E_A$, $E_B$ and $E_C$ which are 120° out of phase with each other and each of which has a maximum magnitude of approximately 307 millivolts. In addition the voltages along lines $E_A$, $E_B$ and $E_C$ are each approximately 20° out of phase with the voltage outputs of the direct axis Hall effect elements A1, B1 and C1.

These voltages are transmitted to the signal translating apparatus which thereupon applies 15 c.p.s. sinusoidal voltages to phase windings A, B and C, which have a maximum magnitude of 307 volts and are in phase with their respective associated voltages along lines $E_A$, $E_B$ and $E_C$. These voltages produce currents which generate a resultant magnetomotive force for each stator pole the axis of which is at approximately 90° with the axis of the magnetomotive force of its respective rotor pole. Thus, substantially all of the current is employed to produce torque. As will be understood, in the arrangement according to this invention this phenomenom is true for all magnitudes of applied voltage and consequently the motor produces substantially maximum attainable torque for all magnitudes of applied voltage because the out of phase currents are maintained at a minimum whereby the motor operates at peak efficiency for any load within its rated capacity as well as any load above that capacity until magnetic saturation of the stator yoke of the motor is reached.

From the foregoing it will be understood that the disclosed servomechanism includes a polyphase alternating current synchronous motor and operates in response to a signal signifying a desired speed for the motor produced by speed dictating apparatus and a signal signifying the actual speed of the motor produced by speed responsive signal means. These signals cause a voltage generating means to apply voltage to said motor to control said motor to deliver torque to maintain a load which is continuously applied to the rotor of said motor at zero angular velocity. Moreover, the motor maintains such a load at any angular position of its rotor. By this is meant that there is no position of the rotor at which it cannot remain at zero angular velocity while a load is applied to it. Thus, when reference is made to any angular position of the rotor herein it is to be understood that this means that each of the infinite positions of the rotor is to be considered one at a time until all are considered.

In addition, the voltage generating means is operable in response to the difference between the desired speed signal and the actual speed signal to apply voltage to said motor to move any load within its rated capacity in any desired predetermined manner within its torque producing capabilities. The voltage generating means includes a first summation circuit which is responsive to the desired and actual speed signals to produce a signal signifying the difference between these speeds. It also includes transducing apparatus which operates in response to this difference signal and produces signals signifying the individual voltages to be applied to the stator phase windings of the motor. These voltages cause the stator windings to produce a resultant stator magnetomotive force for each pole of the stator. The axis of each of these forces throughout the torque producing range of the motor is at approximately a 90° angle with the axis of the magnetomotive force of the corresponding pole of the rotor and the magnitude of each of these forces is properly related to the magnitude of the magnetomotive force of the corresponding pole of the rotor to move the load in accordance with the desired speed signal.

The transducing apparatus of the voltage generating means includes a rotor position transducer connected to the rotor of the motor. This transducer operates to produce two voltages for each phase winding of the motor. One of these is a signal voltage signifying the magnitude, frequency and phase of the voltage to be applied to the associated phase winding to balance the counter electromotive force produced by and the resistance voltage drop existing across the phase winding for the instantaneous speed at which the rotor is then rotating and the current then flowing in the winding. The other is a signal voltage signifying the magnitude, frequency and phase of the voltage to be applied to the associated phase winding to balance both the leakage and the synchronous reactance voltage drop existing across the phase winding for the current then flowing in the winding. These signal voltages for each phase winding are vectorially summed in signal summing amplifier circuitry, which also constitutes part of the transducing apparatus, to produce signals signifying the magnitude, frequency and phase of the individual voltages to be applied to the stator windings in order to insure that the axis of each of the resultant magnetomotive forces of the stator is at approximately a 90° angle with the axis of the corresponding magnetomotive force of the rotor. Signal translating apparatus, which forms part of the voltage generating means, operates in response to the output signals of the signal summing amplifier circuitry to apply the individual voltages to the respective stator phase windings.

The rotor position transducer includes a cylindrical stator yoke of magnetic material and a two pole permanent magnet rotor mounted for rotation in the cylindrical stator yoke. This rotor produces a sinusoidal flux distribution through the stator yoke. It is mechanically connected to the rotor of the motor for rotation therewith. A plurality of Hall effect elements, two for each phase winding of the motor, are mounted at intervals around the interior surface of the stator yoke. The physical location of a different one of such elements corresponds with the physical location of a different one of the axes of the individual phase windings of a stator pole of the motor and another such element is in quadrature with each such corresponding element.

The two pole permanent magnet rotor of the rotor position transducer is geared to the rotor of the motor so that one of the transducer poles passes the Hall effect element in quadrature with that element corresponding to one of the phase windings of a stator pole of the motor each time one of the poles of the rotor of said motor passes the physical location of the axis of the corresponding stator pole phase winding.

The transducing apparatus also includes a direct axis summing amplifier and a quadrature axis multiplier. Each of these receives the difference speed signal and a signal signifying the actual speed of rotation of the motor. The direct axis summing amplifier operates in response to these signals to apply an input current to each of the Hall effect elements corresponding to one of the phase windings of a stator pole of the motor. The magnitude of this current is the sum of a function of the difference speed signal and a function of the actual speed signal. The quadrature axis multiplier operates in response to the difference speed signal and the actual speed signal to apply an input current to each of the quadrature Hall effect elements whose magnitude is a function of the product of the two input signals.

With the foregoing servomechanism it is apparent that an alternating current polyphase synchronous motor can be started under load from any angular position of its rotor and can be operated either clockwise or counterclockwise at any angular speed from zero angular velocity to a rated angular velocity. The motor either receives electrical energy from a supply thereof to produce torque continuously to maintain its rotor at a particular angular velocity when the load applied to the rotor tends to cause it to rotate at a lesser velocity or receives torque continuously and transmits electrical energy back to the supply of electrical energy to maintain its rotor at a particular angular velocity when the load applied to the rotor tends to cause it to rotate at a greater velocity. In addition, starting, acceleration and deceleration are all controllable in any predetermined manner within the torque producing capacity of the motor. Moreover, throughout its torque producing range the motor operates at peak efficiency since the angle between the axis of the resultant magnetomotive force of each stator pole of the motor and the axis of the magnetomotive force of the corresponding rotor pole is maintained at approximately 90°. Since the torque produced by the motor is the product of all the resultant stator magnetomotive forces multiplied by the rotor magnetomotive forces multiplied by the sine of the angle between each pair of forces, maintaining the angle at approximately 90° minimizes the current required to produce any particular torque.

It should also be understood that the disclosed scalar values of direct axis summing amplifier DAS and quadrature axis multiplier QAM are considered ideal and not critical. The values disclosed for the described embodiment are chosen to maintain the out of phase currents at a minimum and the axes of the resultant stator magnetomotive forces at approximately 90° with the axes of the corresponding rotor magnetomotive forces. The effects of reasonable deviations from the ideal, for whatever reason, in a particular embodiment would be essentially nullified by the gain of the servomechanism with the result that such deviations, at worst, would only cause some small out of phase current components.

Modifications in the foregoing apparatus are possible. For example, it is contemplated that cycloconverters may be substituted for the herein disclosed inverter circuitry. Various other modifications are also considered possible without departing from the scope of the invention. Consequently, it is intended that the embodiment specifically described not be considered exclusive or in any sense limiting.

What is claimed is:

1. A servomechanism including a polyphase alternating current synchronous motor which produces torque in accordance with applied load at any angular position of the motor rotor through its speed range from zero angular velocity to a rated synchronous velocity, said system including transducing apparatus operating in response to a signal signifying the torque it is desired that the motor produce and a signal signifying the instantaneous speed of the motor to produce at least one pair of signals associated with one of said phase windings, the magnitude of each of the signals of each of said pairs varying in accordance with the desired torque and the instantaneous speed of the rotor throughout its speed range, and a voltage generator operating in response to said pairs of signals and applying to each phase winding of the motor stator an individual stator voltage to control said motor to produce said desired torque, each of said stator voltages being produced in response to one of said pairs of signals.

2. A servomechanism according to claim 1, wherein said transducing apparatus operates to produce an individual pair of signals for each phase winding of said motor, and wherein the terminal voltage applied to each phase winding is produced in response to the pair of signals individual to its respective phase winding.

3. A servomechanism according to claim 2, wherein said transducing apparatus includes a summing amplifier and a multiplier, both receiving said desired torque signal and said instantaneous speed signal and operating in response to the magnitudes thereof, the summing amplifier producing a signal signifying a sum of the magnitudes of said two received signals and the multiplier producing a signal signifying a product of the two magnitudes.

4. A servomechanism according to claim 3, wherein one of the signals of each pair of signals produced by said transducing apparatus is generated in response to the output signal of said summing amplifier and the other signal of each pair is generated in response to the output signal of said multiplier.

5. A servomechanism according to claim 4, wherein said transducing apparatus comprises a rotor position transducer including a cylindrical stator yoke of magnetic material, a two pole permanent magnet rotor mounted for rotation on said yoke and producing a sinusoidal flux distribution therethrough, said two pole rotor being mechanically connected to the rotor of said motor for rotation therewith and a plurality of Hall effect elements, two such elements for each phase winding of said motor, said elements being mounted at intervals around the interior surface of said yoke so that the physical location of a different one of said elements corresponds with the physical location of the axis of a different one of the individual phase windings of a stator pole of said motor and another such element is in quadrature with each such corresponding element.

6. A servomechanism according to claim 5, wherein said two pole rotor of said rotor position transducer is geared to the rotor of said motor so that one of the poles of said transducer rotor passes the Hall effect element in quadrature with the element corresponding to one of the phase windings of a stator pole of said motor each time one of the poles of the motor rotor passes the physical location of the axis of the corresponding stator pole phase winding.

7. A servomechanism according to claim 6, wherein each of said corresponding Hall effect elements receives the output signal of said summing amplifier and generates one of the signals of one of the pair of signals, said one signal signifying that component of the terminal voltage for its associated phase winding which balances both the counterelectromotive force which would be produced across said phase winding at no load at the speed at which the rotor is then rotating and the resistance voltage drop produced across said phase winding by the current it is then conducting.

8. A servomechanism according to claim 7, wherein each of said Hall effect elements in quadrature receives the output signal of said multiplier and generates the other of the signals of one of the pairs of signals, said other signal signifying that component of the terminal voltage for its associated phase winding which balances the leakage and synchronous reactance voltage drop produced across said phase winding by the current it is then conducting and at the speed at which the rotor is then rotating.

9. A servomechanism according to claim 8, wherein said transducing apparatus includes signal summing amplifier circuitry for each phase winding of said motor, each said signal summing amplifier circuitry receiving the signal produced by the corresponding and quadrature Hall effect elements associated with its respective phase winding and producing an output signal signifying the vector sum of said signals.

10. A servomechanism according to claim 9, including speed dictation apparatus generating a signal signifying a desired speed for said motor and a speed responsive generator generating a signal signifying the actual speed of said motor, and a summation circuit responsive to said desired and actual speed signals producing said desired torque signal.

11. A control system for a polyphase alternating current synchronous motor operable to control said motor to produce torque in response to a continuously applied load with the rotor of said motor at any angular position and at any speed from zero angular velocity to a rated running speed, said system including speed dictation apparatus generating a signal signifying a desired speed for said motor, a speed responsive generator generating a signal signifying the actual speed of said motor, a summation circuit responsive to said desired and actual speed signals and producing a desired torque signal, transducing apparatus responsive to said desired torque signal and said actual speed signal and producing a pair of signals for each of the phase windings of said motor, the magnitude of one of the signals of each pair varying in response to the sum of the magnitudes of said desired torque signal and said actual speed signal, the magnitude of the other of the signals of each pair varying in response to the product of the magnitudes of said desired torque signal and said actual speed signal, and a voltage generator applying to each phase winding of the motor stator an individual stator voltage to control said motor to produce said desired torque in response to the pair of signals associated with the respective phase winding.

12. A control system according to claim 11, wherein said one signal of each pair signifies that component of the terminal voltage applied to its associated phase winding which balances both the counterelectromotive force which would be produced across said phase winding at no load at the speed at which the rotor is then rotating and the resistance voltage drop produced across said phase winding by the current it is then conducting and wherein said other signal of each pair signifies that component of the terminal voltage applied to its associated phase winding which balances the leakage and synchronous reactance voltage drop produced across said phase winding by the current it is then conducting and at the speed at which the rotor is then rotating.

* * * * *